United States Patent [19]

Fairey et al.

[11] Patent Number: 4,813,714

[45] Date of Patent: Mar. 21, 1989

[54] PETROLEUM EQUIPMENT TUBULAR CONNECTION

[75] Inventors: Colin B. Fairey, Houston, Tex.; Elliott Frauenglass, Newington, Conn.; Larry W. Vincent, Montgomery, Tex.

[73] Assignee: Loctite Corporation, Newington, Conn.

[21] Appl. No.: 172,976

[22] Filed: Mar. 21, 1988

Related U.S. Application Data

[63] Continuation of Ser. No. 893,710, Aug. 6, 1986, abandoned.

[51] Int. Cl.$^4$ .............................................. F16L 7/00
[52] U.S. Cl. ...................................... 285/94; 285/333; 285/355; 285/915; 523/176; 156/327
[58] Field of Search ............... 285/390, 369, 417, 333, 285/334, 94, 915, 355; 411/82, 428, 903, 930; 428/357; 523/176; 524/459, 560

[56] References Cited

U.S. PATENT DOCUMENTS

| | | |
|---|---|---|
| Re. 30,647 | 11/1976 | Blose . |
| 2,895,950 | 7/1959 | Krieble . |
| 3,041,322 | 6/1962 | Krieble . |
| 3,043,820 | 7/1962 | Krieble . |
| 3,046,262 | 7/1962 | Krieble . |
| 3,059,697 | 10/1962 | Pitts ................................ 285/915 X |
| 3,203,941 | 8/1965 | Krieble . |
| 3,218,305 | 11/1965 | Krieble . |
| 3,300,547 | 1/1967 | Gorman et al. . |
| 3,361,448 | 1/1968 | Warrington ..................... 285/422 X |
| 3,547,851 | 12/1970 | Frauenglass . |
| 3,625,875 | 12/1971 | Frauenglass et al. . |
| 3,658,624 | 4/1972 | Lees . |
| 3,814,156 | 6/1974 | Bachman et al. . |
| 3,899,382 | 8/1975 | Matsuda et al. ..................... 523/176 |
| 3,969,552 | 7/1976 | Malofsky . |
| 3,988,299 | 10/1976 | Malofsky . |
| 4,244,607 | 1/1981 | Blose . |
| 4,510,270 | 4/1985 | Okamoto ............................ 523/176 |
| 4,550,937 | 11/1985 | Duret .................................. 285/334 |

FOREIGN PATENT DOCUMENTS

| | | |
|---|---|---|
| 0157493 | 10/1985 | European Pat. Off. . |
| 863536 | 3/1961 | United Kingdom . |
| 1255413 | 12/1971 | United Kingdom . |
| 1406321 | 9/1975 | United Kingdom . |
| 2142703 | 1/1985 | United Kingdom . |
| 2159902 | 12/1985 | United Kingdom . |
| 2159906 | 12/1985 | United Kingdom . |

*Primary Examiner*—Dave W. Arola
*Attorney, Agent, or Firm*—Perman & Green

[57] ABSTRACT

An anaerobic sealant composition is employed to seal a pipe joint between pin and box members intended for use in petroleum drilling operations. The composition is applied to one or both of the members. The members are then joined and the composition cured into a solid form which bonds to the members and fills the space between them. The constituents of the composition can be selectively varied to control its lubricity which also affects the make up torque. Additionally, the concentration of the sealant composition can be selectively varied to control the break out torque of the joint to which it is applied, and preferably make the break out torque substantially greater than the make up torque. Excellent seals can be obtained using lower grade pipe, and the pin and box members can be made up with the application of lower torque to the assembly without reducing the sealing capabilty of the connection. The preferred composition also serves as a rust and corrosion inhibitor for the joint.

28 Claims, No Drawings

PETROLEUM EQUIPMENT TUBULAR CONNECTION

This is a continuation of co-pending application Ser. No. 893,710, filed on Aug. 6, 1986, now abandoned.

BACKGROUND OF THE INVENTION

I. Field of the Invention

The present invention relates to an anaerobic sealant composition employed to seal pipe joints between pin and box members intended for downhole tubular goods used in petroleum drilling operations. The invention encompasses not only the sealant composition itself but the method of its application to the pipe joint structure, and the resulting connection.

For purposes of the invention, the term "petroleum" will be taken to include, but not necessarily be limited to, operations related to the exploration, drilling, and extraction from the earth of oil, gas, water, and geothermal materials as well as the disposal of nuclear and/or toxic wastes. Additionally the term "pipe" will be used for convenience to refer to all downhole tubular goods, whether it be tubing, drill pipe, casing, production pipe, or the like.

The term "drilling", likewise, will be taken to include exploration for and extraction of materials from the earth as well as formation of a deep hole through which the materials are extracted. It will be understood, however, that pipe having the same characteristics of that used in petroleum operations can also be used in the opposite sense, that is, to return materials into the earth. Such a procedure is involved in the return of petroleum products to underground storage or the transfer of nuclear wastes to underground containment fields. Thus the term "drilling", for purposes of the invention, will also include preparation for such storage of petroleum or other products or disposal of nuclear or other wastes beneath the surface of the earth. The invention herein is concerned with the connection between two lengths of pipe. The ends to be joined of the two lengths of pipe are commonly referred to as a "pin" and as a "box". In this context, a "pin" may be an externally or internally threaded end of pipe and a "box" may likewise be an externally or internally threaded end of pipe and a coupling connected thereto with suitable threads for receiving a pin. However, these terms should be read sufficiently broadly to cover connecting mechanisms other than threads. Also, the term "make up" and variations thereof are taken to mean assembly of two pin and box members, and the term "break out" and variations thereof, are taken to mean disassembly of the pin and box members.

II. Description of the Prior Art

The problems associated with petroleum drilling operations are many and extreme. The conditions experienced include extremes in temperature, not only between polar regions and equatorial regions, but also of the products being extracted and the high temperature of the formations at depth. Pressures can be intense in the depths of the earth as well as exposure to the harsh corrosiveness of such toxic materials as sulfur dioxide and hydrogen sulfide.

Particularly grueling are the stresses imposed on downhole tubular goods in the instance of a string of pipe which may be many thousands of feet in length.

Couplings or tubular connections for lengths of pipe are of paramount importance in the drilling operation and serve two primary functions. In the first instance, they hold the weight of the pipe which can amount to two million pounds or more and they serve to seal the pipe both against incursions from its exterior as well as loss of the products being extracted. The customary type of pipe connections used in drilling operations are threaded joints and the industry standards which have been established by the American Petroleum Institute (API) are known as "API 8-round" and as "API buttress" threads.

Leaking pipe connections have represented a significant problem to the petroleum industry, and the problem continues although recent research and development efforts by connection manufacturers and operators have made significant improvements in the technology. Premium connection designs employing various combinations of interference-fit threads metal-to-metal seals, new generation of non-metallic seal materials, higher alloyed steels, and computer/numerical control machining technology have been developed and are very effective. Typical of such premium connection designs are those disclosed in Blose U.S. Pat. No. 4,244,607 issued Jan. 13, 1981 and U.S. Pat. No. Re. 30,647 reissued June 16, 1981. These patents are incorporated in and made a part of this application, by reference, as being typical of the technology relating to premium connections.

Some of these designs include "Teflon" brand o-rings, or the like, as sealing aids. In this instance, sufficient material must be removed from the pipe end in the region of the joint to accommodate the o-ring.

Such removal necessarily weakens the joint and increases the stresses imposed on the joint. Furthermore, the o-ring material does not have sufficient plasticity to satisfactorily seal the interstices of the joint.

Nonetheless, failures continue to occur due in part to greater sensitivity of many of these designs to handling, running, and environmental factors. Single failures of production strings have cost millions of dollars and they continue to occur as industry continues to push back the technology frontier. One of the most pervasive causes of these connection failures is leakage. Aside from design problems, many new connections are easily damaged by a variety of common rig and handling procedures.

As a further effort to prevent leaking connections, sealing materials have been developed and are widely used by the industry. Numerous such sealing materials are available such as Shell high pressure thread compound produced by Shell Oil Corporation, EXXON 706 thread compound produced by EXXON Corporation, and "Liquid-O-Ring" brand thread compound manufactured by Oil Center Research, Inc. of Lafayette, La. These materials meet API standards and are referred to as "API modified". Typically, the components of these sealing materials include an oil based lubricant, and sealant components which may include, for example, powdered graphite, lead powder, zinc dust, and copper flake. There is no chemical reaction between the sealant components and the lubricant. The composition is merely a mixture and there is no curing step involved in its preparation or use. These sealing materials remain in a liquid form, seeking any voids which are present between the mating threads within the joint.

While such sealing materials have worked reasonably well, they are, in composition, primarily a lubricant and only secondarily a sealant. The sealant components of the mixture seek out the voids within the threaded joint, but if a hole is large enough, the sealant material will extrude out and the sealant will no longer be effective for its intended purpose. It also often occurs in the harsh environment in which drilling operations take place that the liquid component of the sealant material bakes off in the extreme heat to which it is exposed, leaving voids and the metallic sealant components behind. These components typically have particle sizes lying in a range of 50 to 500 microns. This is not only undesirable during normal drilling operations, but becomes even more of a problem during disassembly of the pipe. Customarily, the same pipe can be used in a number of reinstallations in the same well or installations in successive wells. This, of course, is desirable because of the heavy expense of the piping. However, in the instance in which the lubricant bakes off, the metallic particles left behind are of a gritty consistency and, upon disassembly, sometimes causes gelling to occur on the threads of the pipe. This causes the pipe to be more difficult to disassemble and severely limits the reuseability of the pipe.

SUMMARY OF THE INVENTION

It was with knowledge of the prior art and the problems existing which gave rise to the present invention. The present invention, then, is directed towards a curable sealant composition which is employed to seal a pipe joint between pin and box members intended for use in petroleum drilling operations. In its preferred form, the composition is a single component anaerobic material which is applied to one or both of the members. The members are then joined and the composition cures into a solid form which bonds to the members and fills the space between them. The constituents of the composition can be selectively varied to control its lubricity which also affects the make up torque. Additionally, the concentration of the constituents of the sealant composition can be selectively varied to control the break out torque of the joint to which it is applied, and preferably make the break out torque substantially greater than the make up torque. Excellent seals can be obtained using lower grade pipe, and the pin and box members can be made up with the application of lower torque to the assembly without reducing the sealing capability of the connection. The preferred composition also serves as a rust and corrosion inhibitor for the joint.

Subsequent discussion refers primarily to this preferred composition. The curable sealant composition of the invention (hereinafter "sealant"), in its preferred form, is a high viscosity anaerobic resin which may be combined with powders of PTFE (polytetrafluoroethylene) and/or polyethylene having particles approximately 10 microns in diameter for lubrication. Having a consistency between a thick liquid (e.g. maple syrup) and a soft paste (e.g. toothpaste), the sealant polymerizes between close fitted metal surfaces to provide sealing and resistance to loosening with a low break out strength. The sealant remains liquid indefinitely while exposed to the air. Upon application to and make up of connections, however, complex reactions occur in the sealant which cause it to polymerize in the absence of air to form a hard, high molecular weight, material with adhesive and sealant properties. These reactions are further catalyzed by the presence of iron, copper, nickel and other metals.

The sealant has been specifically designed for use in sealing downhole petroleum drilling pipe joints. While such pipe joints have traditionally been of a threaded nature, the application of the sealant need not be limited to threaded joints but can be applied with similar results to a variety to other types of joints as well. It may used on slightly oiled, cadmium and zinc plated, black oxide, and phosphate and oil coated parts and still obtain satisfactory results. For a maximum benefit, parts should be wipe cleaned, but need not be solvent cleaned to remove an oil coating. This is for the reason that petroleum based oils by nature have an iron content sufficiently high to cause the resin or monomer in the anaerobic sealant to polymerize.

Some of the benefits of the sealant include the fact that it can be applied to the mating surfaces of the pin and box members either by machine or by hand. In the instance of threaded joints, the sealant seals between the threads to prevent spiral leak paths. Indeed, the sealant seals all voids including microgrooves and other regions such as the metal to metal seal areas as found in premium connections. The sealant contains no lead (which is toxic to human beings), is non-stringy (and therefore easy to apply), and employs no flammable solvents (which would be particularly hazardous on a petroleum drilling rig).

Primary benefits of the invention, in addition to its excellent sealing ability, reside in its lubricity which improves the ability to make up and break out pipe joints, in its chemical stability and in the ability to adjust its cohesive and adhesvie strength so as to achieve a desired predetermined value of break out torque. As a result of some of these benefits, the sealant will extend the life of production strings and will permit the upgrading of cheaper pipe for higher pressure applications.

A particularly important feature of the invention resides in the ability to provide a different break out torque for different members of a pipe joint. Specifically, it is common practice to use lengths of pipe in the field which have a pin at one end and a box at the opposite end. In this instance, the box portion of the joint is usually assembled in a factory, then the pipe is shipped to the drilling site. As noted above, the constituents of the sealant composition can be controlled to thereby control the break out torque of the joint. According to this further embodiment of the invention, the concentration of the resin or monomer can be consistently different when applied to the mutually engageable surfaces of the box than when applied to the pin such that, upon subsequent breakout, the same end of each ensuing length of pipe will be a pin and its opposed end will be a box. In this way, handling of the pipe is facilitated to a substantial extent. Prior art sealants customarily are not applied until make up as the pipe is descending into the well. However, with this embodiment of the invention, the sealant having one concentration of the resin or monomer would preferably be applied at the factory at the time of assembly of the box portion of the joint. Then, the sealant having a different concentration of the resin or monomer would be applied during make up in the field.

Other and further features, objects, advantages, and benefits of the invention will become apparent from the following description. However, it is to be understood that both the foregoing general description and the followed detailed description are exemplary and explanatory but are not restrictive of the invention.

DETAILED DESCRIPTION OF THE PREFERRED EMBODIMENTS

The basic composition of the sealant with which the invention is concerned is of a generally known formulation which has been be used in a variety of other applications. Examples which have disclosed the use of monomer compositions having anaerobic properties are U.S. Pat. No. 3,625,875 to Frauenglass et al and U.S. Pat. No. 3,969,552 to Malofsky et al. These patents are incorporated in, and made a part of, this disclosure by reference.

The monomers contemplated for use in the invention disclosed herein are polymerizable acrylate esters. As used herein, "acrylate esters" includes alpha-substituted acrylate esters, such as the methacrylate, ethacrylate, and chloroacrylate esters. Monomers of this type, when mixed with a peroxy initiator as described below, form desirable adhesives and sealants of the anaerobic type.

Anaerobic adhesives and sealants are those which remain stable in the presence of air (oxygen), but which when removed from the presence of air will polymerize to form hard, durable resins. This type of adhesive and sealant is particularly adaptable to the bonding of metals and other nonporous or nonair permeable materials since they effectively exclude atmospheric oxygen from contact with the adhesive or sealant, and therefore the adhesive or sealant polymerizes to bond the surfaces together. Of particular utility as adhesive or sealant monomers are polymerizable di- and other polyacrylate esters since, because of their ability to form cross-linked polymers, they have more highly desirable adhesive or sealant properties. However, monoacrylate esters can be used, particularly if the monacrylate portion of the ester contains a hydroxyl or amino group, or other reactive substituent which serves as a site for potential cross-linking. Examples of monomers of this type are hydroxyethyl methacrylate, cyanoethyl acrylate, t-butylaminoethyl methacrylate, glycidyl methacrylate, cyclohexyl acrylate and furfuryl acrylate. Anaerobic properties are imparted to the acrylate ester monomers by combining with them a peroxy polymerization initiator as discussed more fully below.

One of the most preferable groups of polyacrylate esters which can be used in the adhesives or sealants disclosed herein are polyacrylate esters which have the following general formula:

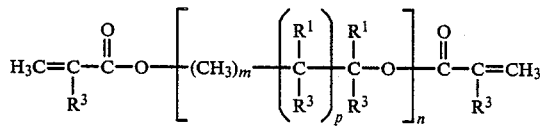

wherein $R^1$ represents a radical selected from the group consisting of hydrogen, lower alkyl of from one to about four carbon atoms, hydroxy alkyl of from one to about four carbon atoms, and

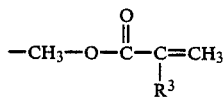

$R^2$ is a radical selected from the group consisting of hydrogen, halogen, and lower alkyl of from one to about four carbon atoms; $R^3$ is a radical selected from the group consisting of hydrogen, hydroxyl, and

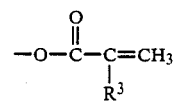

m is an integer equal to at least 1, e.g., from 1 to about 15 or higher, and preferably from 1 to about 8 inclusive; n is an integer equal to at least 1, e.g., 1 to about 20 or more; and p is one of the following: 0, 1.

The polymerizable polyacrylate esters utilized in accordance with the invention and corresponding to the above general formula are exemplified by but not restricted to the following materials: di-, tri- and tetraethylene glycol dimethacrylate, dipropylene glycol dimethacrylate, polyethylene glycol dimethacrylate, di (pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which inhibitors or stablizers, such as polyhydric phenols, quinones, etc. are included. As used herein the term "polymerizable polyacrylate ester monomer" includes not only the foregoing monomers in the pure and impure state, but also those other compositions which contain those monomers in amounts sufficient to impart to the compositions the polymerization characteristics of polyacrylate esters. It is also within the scope of the present invention to obtain modified characteristics for the cured composition by the utilization of one or more monomers within the above formula with other unsaturated monomers, such as unsaturated hydrocarbons or unsaturated esters.

The preferred peroxy initiators for use in combination with the polymerizable acrylate or polyacrylate esters described above are the hydroperoxy polymerization initiators, and most preferably the organic hydroperoxides which have the formula $R^4OOH$, wherein $R^4$ generally is a hydrocarbon radical containing up to about 18 carbon atoms, preferably an alkyl, aryl or aralkyl radical containing from one to about 12 carbon atoms. Typical examples of such hydroperoxides are cumene hydroperoxide, tertiary butyl hydroperoxide, methyl ethyl ketone hydroperoxide and hydroperoxides formed by the oxygenation of various hydrocarbons, such as methylbutene, cetane and cyclohexene. Other organic substances, such as ketones and esters, including the polyacrylate esters represented by the above general formula, can be oxygenated to form hydroperoxy initiators. However, other peroxy initiators, such as hydrogen peroxide or materials such as certain organic peroxides or peresters which hydrolyze or decompose to form hydroperoxides frequently can be used. In addition, U.S. Pat. No. 3,658,624 describes peroxides having a half-life of less than 5 hours at 100° C. as suitable in somewhat related anaerobic systems.

The peroxy initiators which are used commonly comprise less than about 20 percent by weight of the combination of monomer and initiator since above that level they begin to affect adversely the strength of the adhesive and sealant bonds which are formed. Preferably the peroxy initiator comprises from about 0.1 percent to about 10 percent by weight of the combination.

Other materials can be added to the mixture of polymerizable acrylate ester monomer and peroxy initiator, such as quinone or polyhydric phenol stabilizers, tertiary amine or imide accelerators, and other functional materials such as thickeners, coloring agents, etc. These additives are used to obtain commercially desired characteristics, i.e., suitable viscosity and shelf stability for extended periods (e.g., a minimum of one month). The presence of these additives is particularly important when peroxy initiators other than organic hydroperoxides are used. For a complete discussion of the anaerobic systems and anaerobically curing compositions, reference is made to the following U.S. Pat. Nos. 2,895,950 to Vernon K. Krieble, issued July 21, 1959; 3,041,322 to Vernon K. Krieble, issued June 26, 1962; 3,043,820 to Robert H. Krieble, issued July 10, 1962; 3,046,262 to Vernon K. Krieble, issued July 24, 1962; 3,203,941 to Vernon K. Krieble, issued Aug. 31, 1965; 3,218,305 to Vernon K. Krieble, issued Nov. 16, 1965; and 3,300,547 to J. W. Gorman et al, issued Jan. 24, 1967.

However, the aforesaid monomer compositions have been modified (e.g. by adjusting the strength, lubricity, etc.) for the purposes with which the present application is concerned, specifically, as a sealant for pipe joints, and more particularly, between pin and box members intended for use in petroleum drilling operations. Indeed, monomers having anaerobic properties have been totally unknown in the role disclosed herein and provide highly desirable results of a nature previously unknown.

As noted above, the sealant is applied to mating metallic surfaces in a liquid state. It may be applied in any suitable manner as, for example, by brushing, by means of a mechanical applicator, by a ribbon applicator, or by sponge. So long as the parts so coated remain exposed to the air, the sealant remains in its liquid state. However, when the parts are joined such that the internal interengaging surfaces are no longer exposed to the air, then the sealant cures to the solid state. When this occurs, it forms a physical bond to the outer surface of a metal on which it is coated. The presence of the metal to which the sealant is applied can also inititate and thereby accelerate the curing process. The sealant even fills the microgrooves which are formed in the metal resulting in elimination of leak paths for gases and liquids. The sealant provides an absolute, positive seal which works equally well with API 8-round, API buttress, and with premium connections. While the industry has had good experience with premium connections, the present invention provides a sound back up seal which is far more practical and reliable than "Teflon" brand o-rings, for example, that have come to be widely used. Effectively, the sealant of the invention provides a plastic seal throughout the area, without the need to machine expensive grooves (which weaken the pipe) as is required for the "Teflon" seal.

Physical properties of the preferred sealant of the invention include the following:

| PHYSICAL PROPERTIES | UNCURED SEALANT |
|---|---|
| Flash Point | >100° C. (212° F.) |
| Appearance | pink viscous liquid |
| Density | 1.25 |
| Viscosity | 150-500 Pa's |

-continued

| (Brookfield Viscometer type HBT #6 Spindle, 2.5 rpm @ 23 ± 2° C.) | | (150,000–500,000 cP) | |
|---|---|---|---|
| Composition | 2½ RPM | 20 RPM | Thixotropic Ratio |
| 11296 | 75 cP | 30 cP | 2.5 |
| SL21 | 80 cP | 26 cP | 3.1 |
| SL22 | 67 cP | 20 cP | 3.4 |

Note:
Thixotropic ratio refers to the gap filling ability of the sealant and to its ability not to drip when applied. The above numbers reflect this ability of the sealant; specifically, the greater the thixotropic ratio is than 1.0, the less it will drip. Other desirable properties of the sealant in its uncured state include: its ability to be easily dispensed, as from a squeeze tube; its stability, that is, its long shelf life in a package prior to being used; its low toxicity, that is, lack of lead or other heavy metals among its constituents; its nonflammability, that is, its flash point above 212° F. Its lubricity is a measure of how much tension is applied to a joint with a given amount of torque.

Lubricity

Tension (recorded in 100's of pounds) at the following torques:

| | inch pounds | | | |
|---|---|---|---|---|
| Composition | 100 | 200 | 300 | 400 |
| 11296 | 12 | 25 | 38 | 51 |
| SL21 | 15 | 33 | 49 | 68 |
| SL22 | 18 | 39 | 60 | 80 |

PHYSICAL PROPERTIES CURED AND CURING SEALANT

| | (Unseated) Break | Prevail (180°) |
|---|---|---|
| Cure Speed: Inch pounds break/prevail measured on ⅜ × 16 iron nuts and bolts after 24 hours @ 70° F. | | |
| 11296 | 1 in. lb. | 1 in. lb. |
| SL21 | 6 in. lb. | 2 in. lb. |
| SL22 | 8 in. lb. | 3 in. lb. |
| Ultimate Strength: As above but after 4 hours @ 200° F. | | |
| 11296 | 50 in. lb. | 0 in. lb. |
| SL21 | 60 in. lb. | 2 in. lb. |
| SL22 | 60 in. lb. | 5 in. lb. |

Note:
Unseated break means that the nut is free spinning on the bolt. Other desirable properties of the sealant in its cured and curing state include: its cured lubricity; its resistance to heat: it has been tested to 330° F. in heat cycling tests; its resistance to chemical attack (it is essentially chemically inert); and its hot strength - since it is a thermoset plastic composition, the sealant has a high hot strength.

It was previously noted that the sealant may contain PTFE and/or polyethylene additives in the form of a powder for lubricity. Each of these additives may be provided in the range of 0–20% by weight. PTFE increases lubricity slowly while polyethylene increases lubricity at a rapid rate per unit amount added.

In its liquid form, the sealant lubricates as well as or better than existing API thread compounds. Furthermore, because the sealant contains no solvent, there can be no "bake out" or loss of volume under temperature or with time as with known thread compounds. Because there is substantially no loss of volume when it is cured, it prevents leak paths from developing. Furthermore, in its cured solid state, when the pipes are disassembled, the sealant is pulverized into a powder form with lubricating qualities and continues to be as effective a lubricant as it was previously in its liquid or uncured state. This is because molecules of the sealant penetrate and remain in micro-burrs which exist on threads and other surfaces in the connection and reduce the galling effect caused by them.

The resulting threads are substantially clean and require little preparation for re-use. Thus, the sealant of the invention serves as a lubricant during both the make up and break out operations at the same time that it is an effective seal.

Another primary benefit is that the sealant permits sealing at lower make up torques than currently used with non-curing sealants since the curing sealant will plug larger gaps throughout the joint. With known sealants, high torque is necessary in order to prevent leakage, even with premium connections. It will be appreciated that with lower torque, there is less deformation of the pipe and hence a higher life expectancy to be anticipated from the thread. This would enable the use of API 8-round thread and API buttress thread in virtually all instances, thereby eliminating the need for the higher priced premium connections. This is important when one considers that a current price range for API 8-round connections is between ten dollars and twenty dollars per coupling whereas that for premium connections is between two hundred and five hundred dollars per coupling. In some specialized instances, the premium connections can cost even more than five hundred dollars per coupling.

Another benefit of a lower torque requirement is that less stress is imparted to the pipe connections assuring that the pipe will be more resistant to the corrosive effects of such highly toxic substances as hydrogen sulfide and sulfur dioxide which are common in petroleum well environments. Such toxic substances are known to corrode stressed regions in connections more rapidly than unstressed or lesser stressed regions.

Another significant benefit of the invention resides in the ability to control the strength of the sealant, by adjusting the percentage of its constituents. When translated into oil field terminology, this means that the break out torque can be controlled. Specifically, the greater the percentage of resin or monomer, the greater the break out torque when the sealant is applied to a pipe joint, and vice versa. Strength may also be increased by increasing the amount of mineral fillers, although not to the extent of resin variation. Typical mineral fillers are titanium dioxide used as a whitening agent and mica used as a strengthening filler.

Still another benefit of the invention is the ability to assure a substantially higher break out torque than make up torque in those connections where a low makeup torque is desirable. This is achieved by controlling the concentration of the ingredients in the sealant composition. In the preferred embodiment, the ingredient being controlled is the polymerizable acrylate ester monomer. This will assure that an end will not break out inadvertently due to a low make up torque.

The foregoing benefit of controlling break out torque by adjusting the concentration of the resin or monomer in the sealant composition leads to still another benefit of the invention. Specifically, it is desirable from a materials handling standpoint to know which end of a reusable pipe being withdrawn from a well will be a pin and which end will be a box so that the pipe can be uniformly stacked pending further use. This object can be achieved by applying sealant having one concentration of monomer to the box when it is assembled (most likely at the factory), then applying sealant having a different concentration of monomer to the pin at the drill site. The concentration of the monomer would be known in each instance such that the torque for break out of each portion of the joint would likewise be known. By maintaining the concentration of the monomer uniform in each instance, as the pipe is withdrawn from the well for subsequent use, the same end of each subsequent length of pipe will be a pin and its opposite end will be a box. Heretofore, there was no way of knowing whether an end of pipe would be a box or a pin upon break out. This created difficulty with subsequent operations which would be alleviated by the invention.

In addition to adjusting the percentage of the resin or monomer in the sealant composition to adjust break out torque, by making further adjustments to the formulation, it can be made certain that the prevailing strength is less than the break out strength. Prevailing strength is defined as the torque used to unscrew a pin from a box after the pin has been rotated through an arbitrary arc, for example, 180°. If prevailing strength is not maintained to a value less than the break out strength, the torque may increase with continued unscrewing of the pin from the box with the result that the disassembly of the pin and the box will become extremely difficult.

In current practice, relatively high torques are used for make up and something less than the make up torque is required for break out. This latter situation is not desirable, but is a characteristic of a joint to which known sealants have been applied. The higher torques are required to ensure sealing in the connections. The following is an extract from Test Summary 4 below of this disclosure. It clearly shows how the connection was made up to lower torques when the sealant was applied without compromising its sealing capabilities.

| Make-up | Torques - Ft-Lbs | Pressure Test - psi |
| --- | --- | --- |
| API | 2,500 | Leak at 1,500 |
|  | 35,000 | Leak at 8,000 |
| Sealant | 2,500 | Held at 8,000 |

Typically, using known sealant materials, break out torque is less than make up torque. However, by reason of the invention, break out torque can be made greater than make up torque by controlling the properties, specifically, the percentage of resin or monomer in the cured polymer. For example, in the above test, the connection broke out at a torque somewhat less than make up torque when made up with API compound. When the sealant was used, and the connection made up to 2,500 Ft-Lbs, the break-out torque was 14,000 Ft-Lbs.

Still another significant benefit of the invention is the chemical stability of the sealant. Specifically, its composition is such that it is inert to the chemicals normally encountered in petroleum drilling operations. Furthermore, the sealant composition is non-toxic when properly used and will not pollute the environment as will the known sealants, which contain heavy metals such as lead, nickel and the like. Substantial experimentation has indicated no adverse effects with exposure to chemicals encountered in oil field use, including hydrogen sulfide and sulfur dioxide.

Another significant feature of the invention is the self cleaning ability of the sealant. Specifically, upon break out, the solid polymeric material pulverizes and leaves a fine coating on the threads. This fine coating does not interfere with subsequent make up, but has been found to effectively prevent oxidation to an extent better than most known corrosion resistant protective coatings.

Extensive testing has been performed regarding the sealant, and the following reflect some of the more significant tests which have been performed to date using both the anaerobic sealant composition of the invention and previously known compositions in a variety of applications.

Test Summary 1

In this group of tests, the connections used were standard "VAM" single metal-to-metal seal connections with buttress threads. "VAM" is a trademark of Vallourec, a corporation with headquarters in Paris, France, and one of the leading manufacturers of premium connections. Leaks were created on the test sides of the connections by grooves filed into the seals. The connections when made up with API (American Petroleum Institute) modified premium thread compounds, and then they were tested as follows:

(a) 2⅜ inch tubing, Pressure: 10,000 psi nitrogen. Heat cycling: ambient to 320° F. Tension: 200,000 lbs.

(b) 3½ inch casing. Pressure: 10,000 psi hydrostatic (c) 7⅝ inch casing. Pressure: 9,000 psi nitrogen. Heat cycling: ambient to 300° F.

In all instances, the connections sealed when the anaerobic sealing composition was applied to the crippled side of the connection. The break out torques averaged approximately 150% of make up torques. There was no evidence of galling.

Test Summary 2

Pipe Size: 7⅝ inch

Connection types: "VAM" premium connections with metal-to-metal seals and buttress threads.

Two pup joints and two end plugs were assembled with three couplings respectively interposed between the pup joints and the end plugs. One of the end plugs would not hold pressure above 4000 psi, preventing the testing of the complete assembly. This connection was further crippled by notches filed into the seal to cause it to leak. The anaerobic sealant composition of the invention was then applied to the thread area, and the connection was made up again and the entire assembly was subjected to heat and pressure cycling for several days. The connection held pressure through the threads for the entire test period, while leaks occurred in several of the healthy connections in the assembly. The maximum pressure was 9000 psi of nitrogen, and the temperature was cycled from ambient to approximately 300° F.

Test Summary 3

This test used 2½ inch 8-round thread tubing and was designed to compare the anaerobic sealant composition of the invention with an API modified high pressure thread compound manufactured by Shell Oil Corporation:

The sample comprised two threaded pins and a single coupling. One pin contained a machined groove to simulate a field defect. The groove was cut to the root of the thread for the entire length of the thread. The groove was cut 0.060 inches wide at the nose of the pin and tapered to 0.020 inches wide at the end of the thread.

The sample was made up to 2,300 ft-lbs. of torque using a light application of API Modified pipe dope manufactured by Shell Oil Corporation. The sample was pressure tested with nitrogen gas and a leak was noted immediately on the grooved end. It was disassembled and additional API Modified was applied to the grooved end to simulate field conditions. The sample was remade to 1,900 ft-lbs. of torque using the same amount of turns used during the initial make up. Internal gas pressure was then applied and at 3,500 psig pipe dope was noted extruding at the machined groove. A leak developed and the internal pressure bled down to zero psig.

The sample was disassembled, cleaned, and inspected. The sealant of the invention was applied to the grooved end, while API Modified was applied to the other pin end. The sample was made up to 1,700 ft-lbs. and allowed to cure at ambient temperature (approximately 95° F.) for five hours. Internal gas pressure of 7,500 psig was applied and held for two hours. No leakage was observed.

Subsequently, the sample was subjected to 235° F. temperature for one hour. Internal gas pressure of 5,500 psig was applied for one hour while maintaining the elevated temperature and no leakage was observed. The sample was allowed to cool to ambient temperature while maintaining the 5,500 psig internal gas pressure. No leakage was observed.

The sample was then disassembled, cleaned and inspected. Torque of 5,772 ft-lbs. was required to break out the pin with the machined groove and 5,382 ft-lbs. of torque was required to break out the API Modified pin end. The grooved pin broke out smoothly and without problems. No galling was observed on either pin end.

Test Summary 4

Thread Design: 7⅝ inch wedge

Test (a): This was designed to test a "Teflon" ring as a back-up seal in a known leaker. At 2,500 ft-lbs. of make up torque it leaked at 1,500 psi. At 35,000 ft-lbs. it leaked at 8,000 psi. The inventive composition was applied and the connection was made up to 2,500 ft-lbs. It held 8,000 psi. The break out torque was 14,000 ft-lbs.

Test (b): This connection was made up to 35,000 ft-lbs. with API Modified dope and was subjected to a combined tension and internal pressure load of 588,000 lbs. It leaked at 10,000 psi. The inventive composition was applied and under the same conditions, the connection held 13,000 psi.

Test (c): This connection was made up with API dope to 40,000 ft-lbs. It leaked at 5,000 psi. In an effort to test performance of the inventive composition under adverse conditions, the box end of the connection was completely filled with 16 lb drilling mud, and the joint was stabbed into the mud. It sealed to 13,000 psi with no adverse effects from the presence of the drilling mud.

Test Summary 5

| Threads/Mat'l | Test/Notes | Results |
|---|---|---|
| (a) Using preferred composition of invention: | | |
| pipe: 3½ inch diameter 12.7#/ft-SM2550 Threads from a previous test, but still in good | Made up connection to approx. 4,000 ft-lbs (whereas usual minimum torque for con- | No leaks |

-continued

| Threads/Mat'l | Test Summary 5<br>Test/Notes | Results |
|---|---|---|
| condition. Pins were dry-honed with Moly Kote. Couplings phosphated. The torque shoulder and 30° seal area were crippled to thereby create a leak path. | nection is 5,220 ft-lbs). Made up connection allowed to cure for 2 hours. Hydrostatic test @ 10k psi for 2 hrs. Connection broken apart:<br>#11 @ 5,800 ft-lbs.<br>#12 @ 6,200 ft-lbs. | |
| Same as above | Another made up connection to check break out torque after short cure time: 1 hour. Connection broken apart:<br>#11 @ 4,500 ft-lbs.<br>#12 @ 4,500 ft-lbs. | No Test |
| Using API modified compound: | | |
| Same as above | Same as above (long cure time) except: Connection broken apart:<br>#11 @ 3,600 ft-lbs.<br>#12 @ 3,750 ft lbs. | #11 leaked @ 3,000 psi<br>#12 leaked @ 5,000 psi |
| (b) Using preferred composition of invention: | | |
| same as (a) | Made up connection to approx. 4,000 ft-lbs. Allowed to cure for 5 hours. Hydrostatic test to 10k psi overnight. Connection broken apart:<br>#1A @ 6,000 ft-lbs.<br>#5B @ 6,300 ft-lbs. | No leaks |
| same as (a) | Another made up connection to check break out torque after short cure time: 30 min. Connection broken apart:<br>#1A @ 4,750 ft-lbs.<br>#5B @ 4,750 ft-lbs. | No test |
| Using API modified compound: | | |
| same as above | Same as above (long cure time) except: No information re. connection broken apart. | After 15 min. #1A leaked @ 5,100 psi; then, #5B leaked when repressured to 7,000 psi |
| (c) Using preferred composition of invention: | | |
| same as (a) except only pin #1B was crippled | Made up connection to approx. 4,000 ft-lbs. Allowed to cure for 20 hours. Gas (N$_2$) test @ 7,500 psi for 1 hour. | No leaks |
| | Then, pressure removed and connection heated to 300° F.; Gas (N$_2$) test @ 10,000 psi for ½ hour. Connections broken apart:<br>#1B @ 5,700 ft-lbs.<br>#3B @ 6,300 ft-lbs. | No leaks |
| Using API modified compound: | | |
| same as above | Made up connection to approx. 4,000 ft-lbs. Allowed to cure for 20 hours. Hydrostatic test to 10,000 psi | No leaks @ 5,000 psi<br>#1B leaked @ 10,000 psi |
| (d) Using Composition of invention: | | |
| Pipe: 2⅜ inch diameter; 7.7 lbs/ft.; N80 Treated same as (a) above; only one side crippled | Made up connection to approx. 3,000 ft-lbs. (optimum torque) gas (nitrogen) test at 3,600 psi overnight | No Leak |

Test Summary 5

| Threads/Mat'l | Test/Notes | Results |
|---|---|---|
| | Gas pressure increased to 6,500 psi. External tensile load added for total tensile load of approx. 200K lbs. No temperature increase yet | Slight leak; small steady stream of bubbles coming in through water in which assembly immersed. |
| | Assembly heated to 300° F. (w/hot glycol); pressure increased to 8,600 psi; hot cycle maintained approx. 2 hours. | Leak appeared to stop; no more bubbles visible |
| | Assembly cooled by flushing with cold water to approx. 120° F.; pressure dropped to approx. 6,500 psi. | Leak reappeared; small steady stream of bubbles visible through water. |
| | Another hot cycle | No leak visible |
| | Another hot cycle | Leak visible again |
| (e) Using Composition of Invention: | | |
| Pipe: 2⅜ inch diameter 7.7 lbs/ft; N80 VAM premium connection; Treated same as above: only one side crippled | Made up connection to approx. 4,000 ft-lbs. External tensile load: approx. 170,000 lbs; gas pressure (nitrogen) to 9,500 psi | No Leaks |
| | Temperature raised to approx. 300° F. (hot glycol); short time cycles at hot and cold | No Leak visible |
| | Assembly cooled with cold water flush | Leak appeared; small steady stream of bubbles |
| | Temp increased for second hot cycle | No Leak visible |
| | Assembly cooled for second cold cycle | Leak visible again; small steady stream |
| | Temp increased for third hot cycle | No leak visible |
| | Assembly cooled for third cold cycle | Leak visible again; small steady stream |
| | Two more hot and cold cycles | Small pattern of leaking |

Test Summary 6

For these tests, the connections used were VAM-PTS 2⅞ inch N80 premium connections. No galling was evident in the connection or on the pin throughout the test. In order to understand the terminology, col. (1) represents the time of day; col. (2) is tensile load created by the internal applied gas pressure (nitrogen); col. (3) is load applied by pulling frame; col. (4) is combined load of cols. (2) and (3); col. (5) reflects heat cycling; and, with respect to col. (6), leaks were recorded in estimated bubbles per minute escaping from a leaking connection and fed into a jar of water through a small diameter tube.

| First Thermocycle: | | | Test Composition #20 | | |
|---|---|---|---|---|---|
| (1) time | (2) int. press (LBS) | (3) tensile load (LBS) | (4) comb. load (LBS) | (5) temp. (°F.) | (6) remarks |
| 10:05 | 37353 | 162900 | 200253 | 76 | no leak |
| 10:18 | 37737 | 164100 | 201837 | 301 | no leak |
| 10:41 | 37900 | 162900 | 200800 | 101 | no leak |
| 11:02 | 37980 | 163900 | 201880 | 299 | no leak |
| 11:19 | 38069 | 163990 | 202059 | 101 | 120 B.P.M. |
| 11:27 | 38061 | 163800 | 201861 | 306 | no leak |
| 11:57 | 38100 | 163200 | 201300 | 108 | leak & |
| | | | | | end of test |

Results:
No leak on first 2 complete cycles
Small leak on 3rd cold cycle
Leak sealed on 3rd hot cycle

| SECOND THERMOCYCLE | | | TEST COMPOSITION #22 | | |
|---|---|---|---|---|---|
| (1) Time | (2) Int. press (LBS) | (3) tensile load (LBS) | (4) comb. load (LBS) | (5) temp. (°F.) | (6) remarks |
| 16:53 | 13787 | 150139 | 163926 | 80 | 0 |
| 17:13 | 43342 | 155126 | 198468 | 312 | 0 |
| 17:35 | 45278 | 159272 | 204550 | 288 | 0 |
| 17:41 | 45270 | 159597 | 204867 | 281 | 0 |
| 17:47 | 38402 | 152183 | 190585 | 96 | 160 |
| 17:53 | 35329 | 165291 | 200620 | 92 | 160 |
| 17:58 | 40500 | 165157 | 205657 | 324 | 5 |
| 18:02 | 43491 | 165443 | 208934 | 307 | 5 |
| 18:11 | 36955 | 165539 | 202494 | 93 | 160 |
| 18:14 | 35661 | 166036 | 201697 | 96 | 160 |
| 18:16 | 40683 | 165997 | 206680 | 323 | 0 |
| 18:20 | 43402 | 156521 | 199923 | 310 | 0 |

-continued

| SECOND THERMOCYCLE | | | | TEST COMPOSITION #22 | |
|---|---|---|---|---|---|
| (1) Time | (2) Int. press (LBS) | (3) tensile load (LBS) | (4) comb. load (LBS) | (5) temp. (°F.) | (6) remarks |
| 18:26 | 37874 | 156845 | 194719 | 95 | 180 |
| 18:28 | 36512 | 76235 | 112747 | 96 | 180 |
| 18:31 | 35865 | 3400 | 39265 | 97 | 180 |
| 18:33 | 35197 | 70159 | 105356 | 98 | 180 |
| 18:35 | 34478 | 169513 | 203991 | 99 | 180 |

Results:
No leak on initial cycle
Leak on cold cycles
Leak reduced or stopped during hot cycle

| THIRD THERMOCYCLE | | | | TEST COMPOSITION #21 | |
|---|---|---|---|---|---|
| (1) time | (2) int. press (LBS) | (3) tensload (LBS) | (4) comb. load (LBS) | (5) temp. | (6) remarks |
| 10:16 | 1323 | 134625 | 135948 | 297 | No Leaks through-out test |
| 10:18 | 13604 | 134281 | 147885 | 295 | |
| 10:23 | 18873 | 134376 | 153249 | 291 | |
| 10:26 | 18840 | 134109 | 152949 | 290 | |
| 10:30 | 19162 | 134223 | 153385 | 330 | |
| 10:31 | 19169 | 134051 | 153220 | 304 | |
| 10:37 | 17180 | 134223 | 151403 | 103 | |
| 10:40 | 19021 | 134242 | 153263 | 105 | |
| 10:45 | 20337 | 134281 | 154618 | 306 | |
| 10:48 | 21187 | 133994 | 155181 | 312 | |
| 10:54 | 19680 | 133765 | 153445 | 99 | |
| 11:03 | 18079 | 133860 | 151939 | 102 | |
| 11:24 | 17557 | 134739 | 152296 | 100 | |
| 11:27 | 18830 | 134090 | 152920 | 266 | |
| 11:31 | 20186 | 134147 | 154333 | 286 | |
| 11:38 | 18927 | 133879 | 152806 | 92 | |
| 11:42 | 18124 | 133994 | 152118 | 97 | |
| 11:49 | 22465 | 133879 | 156344 | 294 | |
| 11:53 | 23230 | 133841 | 157071 | 297 | |
| 11:59 | 21464 | 133918 | 155382 | 99 | |
| 12:04 | 20335 | 133956 | 154291 | 104 | |
| 12:05 | 20080 | 180690 | 200770 | 103 | |
| 12:14 | 19350 | 180289 | 199639 | 99 | |
| 12:18 | 21302 | 179850 | 201152 | 276 | |
| 12:20 | 21985 | 180060 | 202045 | 287 | |
| 12:26 | 20622 | 180213 | 200835 | 98 | |
| 12:30 | 19678 | 180060 | 199738 | 100 | |
| 12:31 | 19680 | 141904 | 161584 | 99 | |
| 12:32 | 19586 | 128663 | 148249 | 99 | |
| 12:32 | 19600 | 78470 | 98070 | 98 | |
| 12:34 | 19487 | 78566 | 98053 | 98 | |
| 12:36 | 19367 | 78699 | 98066 | 97 | |
| 12:36 | 19398 | 48435 | 67833 | 97 | |
| 12:37 | 19452 | 2770 | 22222 | 97 | |

RESULTS: Seal held throughout test.

| FOURTH TEST | API COMPOUND |
|---|---|
| API compound was applied to the test connections and it leaked profusely at low pressure. | |

Test Summary 7

A test downhole was run on actual well on July 6, 1986. This comprised a string of 7⅝ inch wedge connection, 1,200 ft in length in the form of a linear at the bottom of a 12,800 ft. well. The pipe made up very smoothly with no problems. The pipe stuck in the hole during the lowering of the string, which necessitated the pulling of the string. This resulted in the unusual opportunity to break the pipe out after more than a week of exposure to downhole conditions. The connection broke out very smoothly, with a minimum of cleaning required as compared to normal conditions using API pipe dopes. The average make up torque was 20,000 ft. lbs, and the average break out torque was 30,000 ft./lbs. There was no evidence of galling. The test can be summarized as having been completely successful.

The well is located about 10 miles southwest of Lafayette, La.

Drilling rig—Glasscock 73
Operation—Davis Oil
Connection manufacturer—Tubular Corporation of America, Houston, Tex.

While the preferred embodiments of the invention have been disclosed in detail, it should be understood by those skilled in the art that various modifications may be made to those embodiments disclosed without departing from the scope thereof as described in the specification and defined in the appended claims.

We claim:

1. A method of sealing a pipe joint having a longitudinal axis and including adjoining pin and box members having opposed surfaces and intended for use in petroleum drilling operations comprising the steps of:
   applying a curable sealant composition of the anaerobic type in the uncured liquid state to at least one of the opposed surfaces to prevent leakage after curing occurs;
   while the sealant composition remains in the uncured liquid state, joining the two members together so that the sealant composition after curing adheres to the opposed surfaces of both the pin and box members and blocks the flow path in the longitudinal direction existing between the opposed surfaces; and
   curing the sealant composition to the solid state without substantial volume change from the uncured liquid state to thereby prevent fluid leakage through the joint.

2. A sealed connection between pin and box members of a pipe joint having opposed surfaces and intended for use in petroleum drilling operations produced in accordance with the method of claim 1.

3. A connection as set forth in claim 2 wherein said curable sealant composition is composed partially of a polymerizable acrylate ester monomer, the concentration of the acrylate ester monomer so chosen that the torque required for disassembly of said pipe joint is no less than the torque required for assembly of said pipe joint.

4. A connection as set forth in claim 2 wherein a torque applied to said pin and said box members results in the application of a tension to said pipe joint; and
   wherein said sealant composition includes a lubricating ingredient to thereby control the tension to said pipe joint resulting from administering a specific magnitude of torque to said pin and said box members.

5. In a pipe joint including pin and box members having opposed surfaces and intended for use in petroleum drilling operations, the improvement comprising:
   a curable sealant composition of the anaerobic type applied in an uncured liquid state directly to said pipe joint prior to assembly and cured to a solid state following assembly so as to prevent fluid leakage through the joint, said sealant composition being of substantially equal constant volume both in the uncured liquid state and in the solid state.

6. A pipe joint as set forth in claim 5 wherein, upon disassembly of said pin and box members when said sealant composition is in the fully cured state, said sealant composition is pulverized into a powder form without causing galling of said opposed surfaces.

7. A pipe joint as set forth in claim 5 wherein said curable sealant composition is composed partially of a polymerizable acrylate ester monomer, the conentration of the acrylate ester monomer so chosen that the torque required for disassembly of said pipe joint is no less than the torque required for assembly of said pipe joint.

8. A method of sealing a pipe joint including pin and box members having threaded ends with mutually engageable helical surfaces intended for use in petroleum drilling operations comprising the steps of:
   applying a curable sealant composition of the anaerobic type in the uncured liquid state directly to at least one of the helical surfaces;
   assembling the threaded ends while the sealant composition remains in the uncured liquid state such that the sealant blocks all possible leak paths including the helical flow path defined by the helical surfaces; and
   curing the curable sealant composition without substantial volume change from the uncured liquid state to whereby seal the pipe joint.

9. A method as set forth in claim 8 wherein the curable sealant composition is composed of a polymerizable acrylate ester monomer and other ingredients; and includes the step of:
   controlling the concentration of the acrylate ester monomer to thereby determine the torque required to disassemble the threaded ends.

10. A method as set forth in claim 9
    wherein the step of assemblying the threaded ends includes the step of:
    administering a predetermined torque to the pin and box members; and
    wherein the step of controlling the concentration of the acrylate ester monomer includes the step of:
    choosing a predetermined concentration of the monomer such that the torque required to disassemble the threaded ends after curing is no less than that required to assemble the threaded ends.

11. A method as set forth in claim 9
    wherein the step of assemblying the threaded ends includes the step of:
    administering a predetermined torque to the pin and box members; and
    wherein the step of controlling the concentration of the acrylate ester monomer includes the step of:
    choosing a predetermined concentration of the monomer such that the torque required to disassemble the threaded ends is no less than that required to assemble the threaded ends.

12. A method as set forth in claim 8 wherein the curable sealant composition is composed partially of a polymerizable acrylate ester monomer and including the step of:
    administering a troque to the pin and box members which thereby results in the application of a tension to the pipe joint; and
    providing the sealant composition with a lubricating ingredient to thereby control the tension to the pipe joint resulting from administering a specific magnitude of torque to the pin and box members.

13. A method as set forth in claim 12
    wherein the lubricating ingredient is at least one of powders of polytetrafluoroethylene and polyethylene.

14. A sealed connection to two tubular members intended for use in petroleum drilling operations comprising:
    a pin member;
    a box member mechanically joined to said pin member to thereby form a joint therebetween; and
    a cured sealant of the anaerobic type containing no solvent within said joint to prevent leakage through said joint, said sealant being armed after said joint is formed and composed partially of a polymerizable acrylate ester monomer, the concentration of the acrylate ester monomer so chosen that the torque required for disassembly of said pin member and said box member is no less than the torque required for assembly of said pin member and said box member.

15. A sealed connection as set forth in claim 14
    wherein a torque applied to said pin and said box members results in the application of a tension to said connection; and
    wherein said sealant includes a lubricating ingredient to thereby control the tension to said connection resulting from the application of a specific magnitude of torque to said pin and said box members.

16. A sealed connection as set forth in claim 15
    wherein said lubricating ingredient is at least one of powders of polytetrafluoroethylene and polyethylene.

17. A method of sealing a pipe joint intended for use in petroleum drilling operations, the pipe joint including first and second opposed threaded pipe ends and a threaded coupling for threaded engagement with the pipe ends, the pipe ends and the coupling having mutually engageable helical surfaces, the method comprising the steps of:
    applying a curable sealant composition of the anaerobic type in the uncured state directly to at least the helical surfaces of the pipe ends;
    assemblying the pipe ends and the coupling such that the sealant blocks all possible leak paths including the helical flow path defined by the helical surfaces;
    curing the sealant composition; and
    controlling the concentration of ingredients in the sealant composition to thereby determine the torque required to disassemble the pipe joint.

18. A method as set forth in claim 17 wherein the step of applying a curable sealant composition includes the steps of:
    applying the sealant composition having a first concentration of ingredients resulting in a first magnitude of torque required to disassemble the first threaded pipe end and the coupling; and
    applying the sealant composition having a second concentration of ingredients resulting in a second magnitude of torque, different from said first magnitude of torque, required to disassemble the second threaded pipe end and the coupling.

19. A method as set forth in claim 17
    wherein the curable sealant composition is composed of a polymerizable acrylate ester monomer and other ingredients; and
    wherein the step of controlling the concentration of ingredients in the sealant composition includes the step of:
    controlling the concentration of the acrylate ester monomer therein.

20. A sealed pipe joint intended for use in petroleum drilling operations produced in accordance with the method of claim 17.

21. A sealed connection of two tubular members intended for use in petroleum drilling operations comprising:
   a box member including a first pin member having a threaded end and a threaded coupling member, said first pin member and said coupling member having mutually engageable helical surfaces, said first pin member and said coupling member being threadedly joined;
   a cured sealant having a first concentration of ingredients applied in the uncured state to said helical surfaces of said box member to prevent leakage between said first pin member and said coupling member along a helical flow path defined by said helical surfaces, said first concentration of ingredients resulting in a first magnitude of torque required to disassemble said first pin member from said coupling;
   a second pin member having a threaded end, said second pin member and said coupling member having mutually engageable helical surfaces, said second pin member and said box member being threadedly joined;
   said cured sealant having a second concentration of ingredients applied in the uncured state to said helical surfaces between said second pin member and said coupling member to prevent leakage therebetween along a helical flow path defined by said helical surfaces, said second concentration of ingredients resulting in a second magnitude of torque, different from said first magnitude of torque, required to disassemble said second pin member from said box member.

22. A sealed connection as set forth in claim 21 wherein said sealant is of the anaerobic type.

23. A sealed connection as set forth in claim 21 wherein said sealant is of the anaerobic type composed partially of a polymerizable acrylate ester monomer, said concentration of said acrylate ester monomer being chosen such that the torque required for disassembly of said first pin member and said coupling member is different from that required for disassembly of said second pin member and said box member.

24. In a pipe joint including in and box members having opposed surfaces and intended for use in petroleum drilling operations, the improvement comprising:
   a curable sealant composition applied in an uncured liquid state to said pipe joint during assembly and cured to a solid state following assembly so as to prevent fluid leakage through the joint;
   wherein, upon disassembly of said pin and box members when said sealant composition is in the fully cured state, said sealant composition is pulverized into a powder form without causing galling of said opposed surfaces.

25. A method of sealing a pipe joint intended for use in petroleum drilling operations, the pipe joint including first and second opposed threaded pipe ends and a threaded coupling for threaded engagement with the pipe ends, the pipe ends and the coupling having mutually engageable helical surfaces, the method comprising the steps of:
   applying a curable sealant composition in the uncured state to at least the helical surfaces of the pipe ends;
   assemblying the pipe ends and the coupling such that the sealant blocks all possible leak paths including the helical flow path defined by the helical surfaces;
   curing the sealant composition; and
   controlling the concentration of ingredients in the sealant composition to thereby determine the torque required to disassemble the pipe joint,
   the step of applying a curable sealant composition including the steps of:
   applying the sealant composition having a first concentration of ingredients resulting in a first magnitude of torque required to disassembly the first threaded pipe end and the coupling; and
   applying the sealant composition having a second concentration of ingredients resulting in a second magnitude of torque, different from said first magnitude of torque, required to disassemble the second threaded pipe end and the coupling.

26. A method of sealing a pipe joint intended for use in petroleum drilling operations, the pipe joint including first and second opposed threaded pipe ends and a threaded coupling for threaded engagement with the pipe ends, the pipe ends and the coupling having mutually engageable helical surfaces, the method comprising the steps of:
   applying to at least the helical surfaces of the pipe ends a curable sealant composition of the anaerobic type composed of a polymerizable acrylate ester monomer and other ingredients in the uncured state;
   choosing for application to the first threaded pipe end the sealant composition having a first predetermined concentration of the monomer such that the torque required to disassemble the first pipe end and the coupling will be of a first magnitude; and
   choosing for application to the second threaded pipe end the sealant composition having a second predetermined concentration of the monomer such that the torque required to disassemble the second pipe end and the coupling will be of a second magnitude different from the first magnitude;
   assemblying the pipe ends and the coupling such that the sealant blocks all possible leak paths including the helical flow path defined by the helical surfaces;
   curing the sealant composition; and
   controlling the concentration of the acrylate ester monomer in the sealant composition to thereby determine the torque required to disassemble the pipe joint.

27. A method as set forth in claim 26 including the step of:
   providing the sealant composition with a lubricating ingredient to thereby control the tension to the pipe joint resulting from administering a specific magnitude of torque to the respective pipe ends.

28. A method as set forth in claim 27 wherein the lubricating ingredient is at least one of polytetrafluoroethylene and polyethylene.

* * * * *